(12) United States Patent
Baker, Jr.

(10) Patent No.: US 7,546,285 B1
(45) Date of Patent: Jun. 9, 2009

(54) SYSTEM AND METHOD FOR SCORING DEVELOPMENT CONCEPTS

(75) Inventor: Larry E. Baker, Jr., Arlington, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 355 days.

(21) Appl. No.: 10/950,002

(22) Filed: Sep. 24, 2004

(51) Int. Cl.
*G06F 7/00* (2006.01)

(52) U.S. Cl. ...................................... 707/2; 707/103 R

(58) Field of Classification Search ............. 707/103 R, 707/104.1, 103 Z, 102, 103 Y; 705/7, 10
See application file for complete search history.

(56) References Cited

U.S. PATENT DOCUMENTS

| | | | |
|---|---|---|---|
| 6,039,688 | A | 3/2000 | Douglas et al. |
| 6,115,691 | A * | 9/2000 | Ulwick ........................... 705/7 |
| 6,466,928 | B1 * | 10/2002 | Blasko et al. .................. 706/46 |
| 2002/0038321 | A1 * | 3/2002 | Keeley ........................ 707/514 |
| 2002/0087757 | A1 | 7/2002 | Wagner |
| 2002/0107722 | A1 * | 8/2002 | Laurin et al. .................. 705/10 |
| 2002/0169658 | A1 * | 11/2002 | Adler ........................... 705/10 |
| 2003/0149610 | A1 * | 8/2003 | Rowan et al. .................. 705/10 |
| 2003/0151632 | A1 * | 8/2003 | Ryu et al. ..................... 345/853 |
| 2004/0059628 | A1 * | 3/2004 | Parker et al. ................... 705/12 |
| 2004/0162751 | A1 * | 8/2004 | Tsyganskiy et al. ........... 705/10 |
| 2004/0230468 | A1 | 11/2004 | King et al. |
| 2004/0237030 | A1 * | 11/2004 | Malkin ........................ 715/505 |
| 2005/0198047 | A1 | 9/2005 | Garcia et al. |
| 2006/0184414 | A1 * | 8/2006 | Pappas et al. .................. 705/10 |

OTHER PUBLICATIONS

Adams, Mark, et al., *Concept Selection Tool and Process*, Filing Date—May 28, 2004, U.S. Appl. No. 10/857,759, Specification (29 pgs.), Drawings (9 sheets).
Adams, Mark, *Collaborative Ideation Tool*, Filing Date—May 28, 2004, U.S. Appl. No. 10/857,758, Specification (39 pgs.), Drawings (7 sheets).
Hemmat, Merzad, *Defining and Sizing Feasible Approaches to Business Needs Within an Integrated Development Process*, Filing Date—May 5, 2003, U.S. Appl. No. 10/429,615, Specification (33 pgs.), and Drawings (3 sheets).
www.imaginatik.com, *Imaginatik—Leaders in Innovation Management*, Nov. 23, 2004, 45 Pages.

(Continued)

*Primary Examiner*—Mohammad Ali
*Assistant Examiner*—Jason L Alvesteffer

(57) ABSTRACT

A system for scoring a concept is provided. The system includes a data store, a graphical user interface, and a scoring component. The data store maintains values for categories, sub-area weighting factors, and area weighting factors. The graphical user interface allows a user to score a concept based on a plurality of categories of the concept. At least some of the categories are associated with one of a plurality of sub-areas, and at least one of the sub-areas is associated with one of a plurality of areas. The scoring component is operable based on the categories selected by the user to calculate a concept score using the values for the categories selected by the user. The scoring component also calculates the concept score using the sub-area weighting factors to weight the associated sub-areas, and also uses the area weighting factors to weight the associated areas.

31 Claims, 3 Drawing Sheets

OTHER PUBLICATIONS www.balancedscorecard.org, *What is the Balanced Scorecard?*, Nov. 23, 2004, 3 Pages.

www.ideax.info, *Ideax Webview Toolkit*, Nov. 23, 2004, 2 Pages.

Office Action dated Feb. 16, 2007, U.S. Appl. No. 10/857,759, 13 pages.

Office Action dated Jun. 29, 2007, U.S. Appl. No. 10/857,759, 18 pages.

Final Office Action dated Dec. 10, 2007, U.S. Appl. No. 10/857,759, 26 pages.

Office Action dated Apr. 30, 2008, 19 pages, U.S. Appl. No. 10/857,759.

Office Action dated Oct. 22, 2008, U.S. Appl. No. 10/857,759, 20 pages.

* cited by examiner

SYSTEM AND METHOD FOR SCORING DEVELOPMENT CONCEPTS

CROSS-REFERENCE TO RELATED APPLICATIONS

This application includes subject matter related to U.S. patent application Ser. No. 10/857,759, entitled "Concept Selection Tool and Process," filed May 28, 2004, and incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software, and more particularly, but not by way of limitation, to a system and method for scoring concepts for enterprise development to provide an objective indication of merit.

BACKGROUND OF THE INVENTION

Without continuous improvement, an enterprise tends to atrophy. Product revenue tends to decline; process inefficiencies tend to accumulate; and competitiveness tends to become impaired. To remain healthy and competitive, an enterprise must actively reinvent itself. Typically, opportunities to better the enterprise arise from many sources. Enterprise research and development (R&D) activities explore capabilities significantly different from those currently possessed by the enterprise. Competitive research and analysis suggest changes needed to meet or exceed the capabilities possessed by other industry players. Market research explores the changing needs of customers and exposes new forces and patterns of behavior and desire that drive change. Business development identifies new partnerships or relationships that could add value to the enterprise. Operations uncover inefficiencies and gaps that if corrected would make the enterprise stronger. Strategic business planners and executives set overall direction for the enterprise. This universe of potential change represents alternate futures of the enterprise. Considerable money and time may need to be invested in making a change before it begins to return value. Enterprises typically have limited budgets for investing in change. It is vital to select the correct projects to fund because funding the wrong changes may leave the enterprise in a weakened marketplace position. Also, poor selection reduces cash flow, depletes the funds available for change, and ultimately means that there are fewer resources to invest in other change projects.

Enterprises need to look well into the future, to anticipate the economic environment in which they will be operating, and to develop a plan for achieving success in that future economic environment. This activity may be called strategizing, and the product of this activity is a strategy or a strategic initiative. This activity is typically performed by high level executives and by specialized staff dedicated to strategic planning, well removed from the day-to-day operational details of the enterprise. For these strategies to benefit the enterprise they must be translated to operational activities.

SUMMARY OF THE INVENTION

According to one embodiment, a system for scoring a concept is provided. The system includes a data store, a graphical user interface, and a scoring component. The data store maintains values for categories, sub-area weighting factors, and area weighting factors. The graphical user interface allows a user to score a concept based on a plurality of categories of the concept. At least some of the categories are associated with one of a plurality of sub-areas, and at least one of the sub-areas is associated with one of a plurality of areas. The scoring component is operable based on the categories selected by the user to calculate a concept score using the values for the categories selected by the user. The scoring component also calculates the concept score using the sub-area weighting factors to weight the associated sub-areas, and also uses the area weighting factors to weight the associated areas.

In another embodiment, a method for scoring a concept is provided. The method includes assigning values to a plurality of coefficients and to a plurality of category values. The method includes selecting a plurality of categories, one category from each of a plurality of sub-areas. The method includes reading the coefficients from a data store and reading the category values from the data store. Each category value is associated with one of the selected categories. The method also includes calculating a concept score based on the coefficients and the category values.

According to another embodiment, a system for scoring concepts is provided that includes a graphical user interface, a data store, and a scoring component. The graphical user interface is operable to display, for selection by a user, a plurality of categories for each of a plurality of sub-areas. The plurality of sub-areas are associated with an area. The data store is in communication with the graphical user interface and contains a plurality of sub-area coefficients. Each sub-area coefficient is associated with one of the plurality of sub-areas. The data store also contains a plurality of category values, each category value is associated with one of the plurality of categories. The scoring component communicates with the graphical user interface and the data store and is operable based on the user's selection of categories for each of the sub-areas to determine a concept score. The concept score is based on the category values associated with each of the selected categories and uses the sub-area coefficient of the sub-area associated with the selected category. The concept score is used to evaluate the concept for funding.

In another embodiment, a method of evaluating a strategic change in a business is provided. The method includes assigning values to a plurality of coefficients based on a first strategic view of the business and assigning values to a plurality of category values. The method provides for selecting a plurality of categories, one category from each of a plurality of sub-areas. The plurality of coefficients include a plurality of sub-area coefficients each associated with one of the plurality of sub-areas and a plurality of area coefficients each associated with one of a plurality of areas. Each area has one or more associated sub-areas, and each sub-area has a plurality of categories. The method includes reading the coefficients from a data store, and calculating a first concept score using the coefficients. The method includes changing at least one of the coefficients based on a second strategic view of the business, and calculating a second concept score using the changed coefficients. The method also provides for using the first and second concept scores for evaluation.

In one embodiment, a system for scoring concepts is provided that includes a graphical user interface, a scoring component, and a data store. The graphical user interface receives user input and displays for selection by a user a plurality of categories for each of a plurality of sub-areas. The plurality of sub-areas are associated with an area. The data store is in communication with the graphical user interface and contains coefficients each associated with the area and one of the plurality of sub-areas. The data store also maintains a plurality of category values each associated with one of the plurality of categories. The scoring component communicates with the graphical user interface and the data store. The scoring component is operable based on the user's selection of categories for each of the sub-areas to determine a concept score. The score is based on the category values associated with each of the selected categories and the sub-area coefficient of the sub-area associated with the selected category. The concept score is used in evaluating the concept for funding. The scoring component is operable in response to the user updating one or more of the coefficients associated with the area and sub-areas to automatically recalculate the score using the updated coefficients.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The careers and compensation of employees in an enterprise are often affected by whether specific projects are authorized, funded, and implemented. Consequently, the project funding process may be highly politicized as employees compete to obtain approval for their projects. A politicized funding process does not tend to select the projects best suited to optimizing the enterprise as a whole.

Strategies which are painstakingly crafted by high level executives of enterprises may be difficult to bring to bear on the day-to-day operations of the enterprise. Strategies by their nature are often abstract and directional. Sometimes mere lip service is paid to implementing the strategies in projects. It is not enough to assent to and praise the enterprise strategies. To become reality, these strategies must be incorporated in the project funding decision making process and embodied in projects. The high level executives who craft enterprise strategies may find it difficult to quickly identify what projects support which strategies or to quickly identify the effect on project prioritization of changing the enterprise strategies.

What is needed is a development concept scoring tool which provides an objective element to the enterprise project concept selection process. In one embodiment a system and methods are provided that make discrete evaluation choices and calculate a figure of merit which may provide an objective basis for comparing among project concepts which compete for enterprise funding and/or selection.

Figure 1:
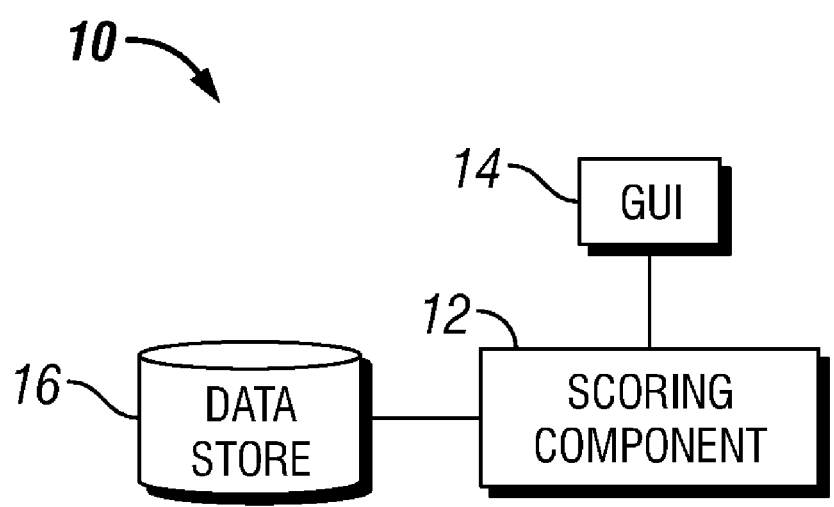
FIG. 1 is a block diagram of a system for scoring development concepts according to one embodiment.

Turning now to FIG. 1, a block diagram of a system 10 for scoring development concepts is depicted. The system 10 comprises a scoring component 12, a graphical user interface (GUI) 14, and a data store 16. The scoring component 12 is a computer program or application which may be executed on any general purpose computer system. General purpose computer systems will be discussed in greater detail hereinafter.

The GUI 14 displays a scoring screen which guides a user through a process of providing scoring information to the scoring component 12. The scoring information comprises selections of categories for each of a plurality of sub-areas, each sub-area associated with an area. For example, a financial scoring area may be composed of a revenue projection sub-area and a cost projection sub-area. The revenue projection sub-area may provide a first category $0 to $99999, a second category $100000 to $19999, a third category $200000 to $499999, a fourth category $500000 to $1 M, and a fifth category over $1 M from which to select based on the revenue projections of the concept. The provision of a limited number of projected revenue categories from which to choose makes the choices discrete, promotes objectivity in the scoring process, and promotes uniform scoring. The categories selected using the GUI 14 may be stored by the scoring component 12 during the concept evaluation session and may be stored in the data store 16 after the concept evaluation session has completed. When all the category selections have been entered, the user may trigger the scoring of the concept with a button selection on the GUI 14, for example.

The scoring component 12 calculates a score of the concept providing an objective measure of the merit of a development project. The score of the concept is an objective measure because all development projects are scored employing the same scoring model using the same weighting factors and category values. The scoring model, the weighting factors, and the category values are discussed in greater detail hereinafter. Note, however, that other factors besides the score of the concept may need to be considered to choose a development concept or development project for funding, for example a development concept may score poorly but be selected for development to satisfy regulatory requirements in a timely fashion. For further details about how the system 10 for scoring development concepts may be employed in the context of a full concept selection process see U.S. patent application Ser. No. 10/857,759, entitled "Concept Selection Tool and Process," filed May 28, 2004, which is incorporated herein by reference for all purposes.

Each category is associated with a numeric value, called a category value, related to the desirability or undesirability of the category. For example, the revenue categories enumerated above may be associated with numeric values as follows:

| | |
|---|---|
| $0-$99999 | 1 |
| $100000-$199999 | 2 |

-continued

| | |
|---|---|
| $200000-$499999 | 5 |
| $500000-$1 M | 10 |
| >$1 M | 20 |

The values associated with the categories for each of the sub-areas is stored in the data store 16 and are readily modifiable without changing the scoring component 12.

The scoring component 12 calculates a sub-score or a sub-area score associated with an area by multiplying the category value associated with the category selected for the sub-area by a sub-area coefficient associated with the sub-area. The sub-area coefficient may be referred to as a weighting factor, a sub-area weighting factor, or a sub-heading weighting factor, and is employed to scale the relative importance of the scores of each of the sub-areas within an area. The sub-area coefficients are stored in the data store 16 and are readily modifiable without changing the scoring component 12. The sub-area coefficient may be either positive or negative. The sub-area coefficient may be negative when the sub-area is generally considered a negative factor, such as cost. The area score is a sum of products and may be represented as:

$$\text{Area score} = \Sigma C_i * (\text{selectedCategoryValue}_i)$$

where the $\Sigma$ operator indicates that a series of values $C_i$ are summed, $C_i$ is the i-th sub-area coefficient, and selectedCategoryValue$_i$ is the category value associated with the category selected for the i-th sub-area.

The scoring component 12 calculates the score of the concept by multiplying each area score by an area coefficient associated with the particular area. The area coefficient may be referred to as a weighting factor, an area weighting factor, or a heading weighting factor, and is employed to scale the relative importance of the scores of each area within the concept score. The area coefficients are stored in the data store 16 and are readily modifiable without changing the scoring component 12. The area coefficient may be either positive or negative. The concept score is a sum of products and may be represented as:

$$\text{Concept score} = \Sigma C_j * (\text{AreaScore}_j) = \Sigma C_j * \{\Sigma C_{j,i} * (\text{categoryValue}_{j,i})\} \quad (1)$$

where the $\Sigma$ operator indicates that a series of products $C_j * (\text{AreaScore}_j)$ are added, $C_j$ is the j-th area coefficient, $\text{AreaScore}_j$ is the j-th area score, $C_{j,i}$ is the i-th sub-area coefficient of the j-th area, and categoryValue$_{j,i}$ is the category value associated with the category selected for the i-th sub-area of the j-th area. The equation (1) may be referred to as a concept scoring model or as a scoring model.

An exemplary concept score is now calculated following the above scoring model based on exemplary area coefficients, sub-area coefficients, and category values defined as follows:

| Area: area coefficient | Sub-area: sub-area coefficient | Category: categoryValue |
|---|---|---|
| Financial: 3 | Revenue sub-area: 5 | 0-$99999: 1 |
| | | $100000-$199999: 2 |
| | | $200000-$499999: 5 |
| | | $500000-$1 M: 10 |
| | | >$1 M: 20 |

-continued

| Area: area coefficient | Sub-area: sub-area coefficient | Category: categoryValue |
|---|---|---|
| | Cost sub-area: −3 | 0-$99999: 1 |
| | | $100000-$199999: 2 |
| | | $200000-$499999: 5 |
| | | $500000-$1 M: 10 |
| | | >$1 M: 20 |
| Strategy: 2 | Strategy Sub-area1: 3 | SSA1 category1: 1 |
| | | SSA1 category2: 5 |
| | | SSA1 category3: 10 |
| | Strategy sub-area2: 2 | SSA2 category1: 3 |
| | | SSA2 category2: 5 |
| Architecture: 2 | Architecture sub-area1: 2 | ASA1 category1: 2 |
| | | ASA1 category2: 4 |
| | | ASA1 category3: 6 |
| | Architecture sub-area2: 3 | ASA2 category1: 1 |
| | | ASA2 category2: 4 |
| Marketing: 1 | Marketing sub-area1: 3 | MSA1 category1: 3 |
| | | MSA1 category2: 5 |
| | | MSA1 category3: 7 |

Note that the identification of areas, sub-areas, categories, area coefficients, sub-area coefficients, and category values are exemplary and may be different in other embodiments.

For this example the following category selections are made. In the financial area, the $200000-$499999 value of the revenue category and the 0-$99999 value of the cost category are selected. In the Strategy area, Strategy sub-area1, SSA1 category2 value is selected, and the Strategy sub-area2, SSA2 category1 value is selected. Strategy sub-areas may include, for example, "information technology consolidation", "business infrastructure growth", or a particular aspect of the company's financial growth, such as "top-line growth", or "cost reduction". Categories may be include, for example, "high", "medium", or "low impact" on the particular strategy sub-area. Examples of categories that might be associated with a strategy sub-area of "top-line growth" might be "dramatically improves top-line growth", "improves top-line growth", "neutral", "negatively impacts top-line growth", or "dramatically reduces top-line growth". The category of "dramatically improves top-line growth" might be assigned a high positive-number score, while the category of "dramatically reduces top-line growth" might be assigned a high negative-number score.

In the Architecture area, Architecture sub-area1, the ASA1 category3 value is selected, and the Architecture sub-area2, the ASA2 category1 value is selected. Examples of architecture sub-areas might be "systems infrastructure", implementation of a particular state of architecture, "compliance", or "corporate integration". Categories may be "yes" or "no" for whether the initiative promotes an architecture sub-area of, for example, of "compliance". In the Marketing area, sub-area1, the MSA1 category3 value is selected. Examples of marketing sub-areas might include "customer care", "market penetration", "market scope". In some embodiments, the each sub-area may have only a limited number of categories, such as a six category maximum associated with each sub-area.

The concept score is calculated as $$\text{Concept score} = C_1 * \text{FinancialScore} + C_2 * \text{StrategyScore} + C_3 * \text{ArchitectureScore} + C_4 * \text{MarketingScore}$$

Where $C_1$ is the financial area coefficient, $C_2$ is the strategy area coefficient, $C_3$ is the architecture coefficient, and $C_4$ is the marketing coefficient. Taking the area coefficients from the table above $$\text{Concept score}=3*\text{FinancialScore}+2*\text{StrategyScore}+2*\text{ArchitectureScore}+1*\text{MarketingScore}$$

The financial area score is calculated as $$\text{FinancialScore}=C_{1,1}*\text{categoryValue}_{1,1}+C_{1,2}*\text{categoryValue}_{1,2}$$

where $C_{1,1}$ is the revenue sub-area coefficient, $C_{1,2}$ is the cost sub-area coefficient, categoryvalue$_{1,1}$ is the value associated with the selected revenue category, and categoryValue$_{1,2}$ is the value associated with the selected cost category. Taking financial sub-area coefficients from the table above $$\text{FinancialScore}=5*5+(-3)*1=25-3=22$$

The strategy area score is calculated as $$\text{StrategyScore}=C_{2,1}*\text{categoryValue}_{2,1}+C_{2,2}*\text{categoryValue}_{2,2}$$

where $C_{2,1}$ is the strategy sub-area1 coefficient, $C_{2,2}$ is the strategy sub-area2 coefficient, categoryValue$_{2,1}$ is the selected strategy sub-area 1 category value, and categoryValue$_{2,2}$ is the selected strategy sub-area 2 category value. Taking strategy sub-area coefficients from the table above $$\text{StrategyScore}=3*5+2*3=15+6=21$$

The architecture score is calculated as $$\text{ArchitectureScore}=C_{3,1}*\text{categoryValue}_{3,1}+C_{3,2}*\text{categoryValue}_{3,2}$$

where $C_{3,1}$ is the architecture sub-area1 coefficient, $C_{3,2}$ is the architecture sub-area2 coefficient, categoryValue$_{3,1}$ is the selected architecture sub-area1 category value, and categoryValue$_{3,2}$ is the selected architecture sub-area2 category value. Taking the architecture sub-area coefficients from the table above $$\text{ArchitectureScore}=2*6+3*1=12+3=15$$

The marketing score is calculated as $$\text{MarketingScore}=C_{4,1}*\text{categoryValue}_{4,1}$$

where $C_{4,1}$ is the marketing sub-area1 coefficient and categoryValue$_{4,1}$ is the selected marketing sub-area1 category. Tanking the marketing sub-area coefficient from the table above $$\text{MarketingScore}=3*7=21$$

With each of the area scores calculated, the exemplary concept score can be calculated as $$\text{Concept score}=3*22+2*21+2*15+1*21=66+42+30+21=159$$

This scoring is only exemplary. In another embodiment, other areas, other sub-areas, other weightings, and other category values may be employed.

Because cost may be considered a negative factor in evaluating a concept, the cost sub-area coefficient was assigned the value −3. An alternate means to make increased costs diminish the score of a concept may be to employ a positive factor as the cost sub-area coefficient, for example "1", and to change the category values associated with the cost sub-area, for example to associate the cost category 0-$99999 with the value 20, to associate the cost category $100000-$199999 with the value 10, to associate the cost category $200000-$499999 with the value 5, to associate the cost category $500000-$1 M with the value 2, and to associate the cost category >$1 M with the value 1.

Figure 2:
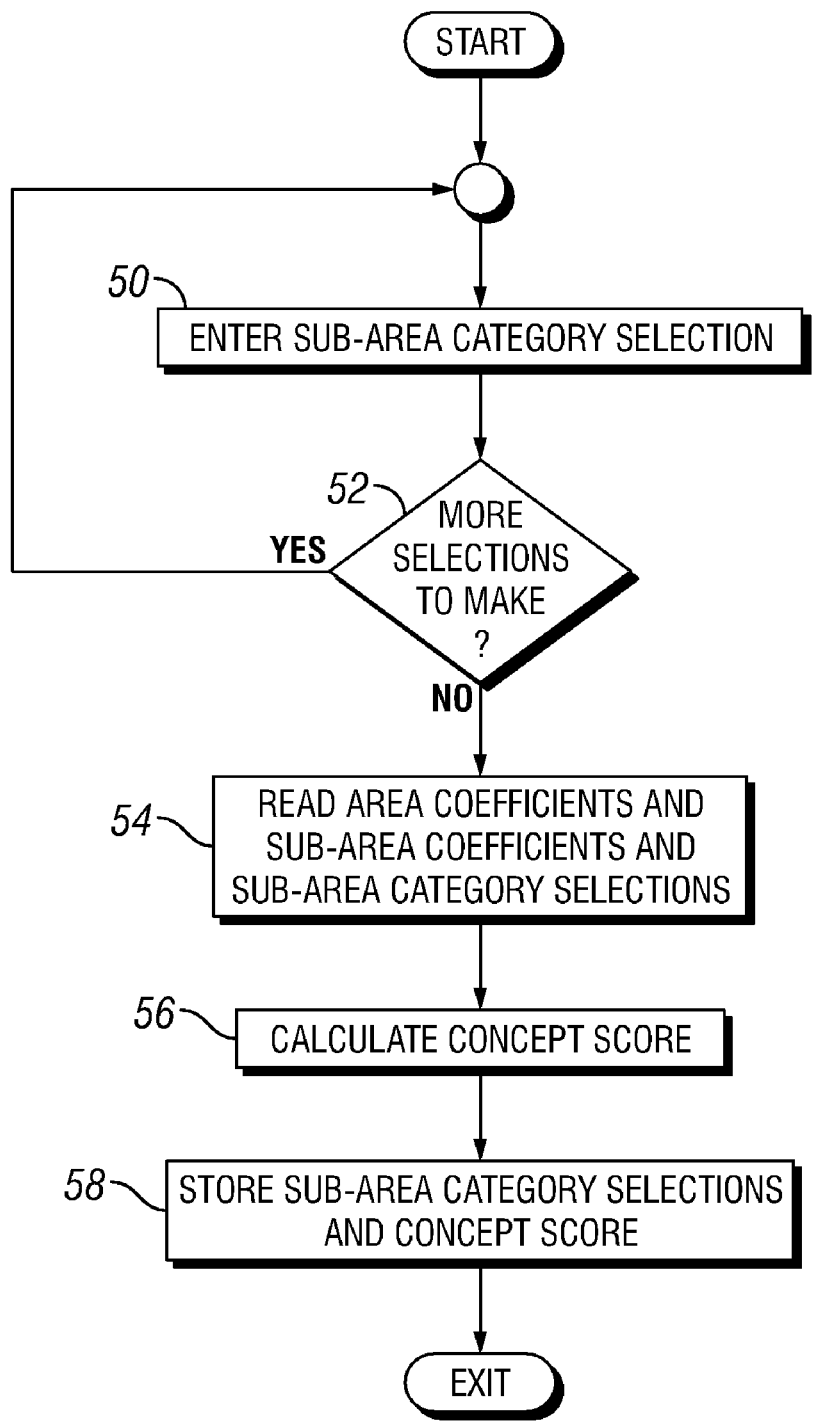
FIG. 2 is a flow chart that depicts a method for scoring development concepts according to an embodiment of the disclosure.

Turning now to FIG. 2, a flow chart depicts a method for using the system 10 for scoring development concepts. In block 50 a category selection associated with a sub-area, for example the projected revenue category $200000-$499999, is entered, for example by using the GUI 10. The method proceeds to block 52 where if all sub-area selections for all areas have been entered the method proceeds to block 54. By looping through blocks 50 and 52 all sub-area category selections of all areas are entered.

In block 54 the area coefficients, the sub-area coefficients, and the category values associated with the sub-area category selections are read. By reading the area coefficients, the sub-area coefficients, and the category values during each concept scoring session the scoring method is assured to calculate according to the latest values. The method proceeds to block 56 where the concept score is calculated according to the scoring model of equation (1) above, using the area and sub-area coefficients and the category values associated with the selected categories. The method proceeds to block 58 where the sub-area category selections entered and the calculated concept score are stored, for example in the data store 16. The method then exits.

In an embodiment, modifications to area coefficients, sub-area coefficients, and/or category values in the data store 16 generate a trigger action which causes all concept scores stored in the data store 16 to be recalculated and stored. For example, when one or more of the coefficients are adjusted, the system 10 may be operable to automatically recalculate the scores. This enables planners to quickly determine the effects on the company's research and development efforts of changes in strategic initiatives, since the concept scores are automatically recalculated, or reprioritized with the new weightings. This gives planners the ability to immediately assess the impact of such changes.

In another embodiment, the system 10 is operable for testing different strategies and, by adjusting the weightings or coefficients, quickly ascertaining how such changes impact the company, for example, the research and development and planning efforts. Also, one technique for analyzing concepts using the present invention may include changing the weighting or coefficients, or scores and identifying those concepts that, for example, continue to score higher, or those that maintain a high average score when strategies or initiatives, or their importance are changed.

Figure 3:
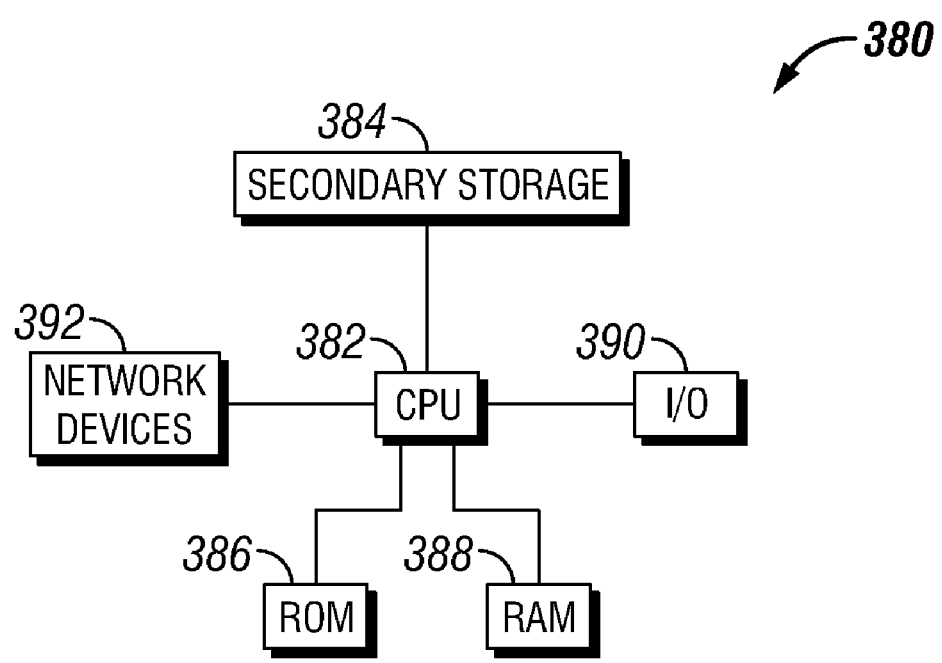
FIG. 3 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A computer implemented method of evaluating a strategic change in a business, comprising:

displaying, via a computer display, a scoring screen for evaluating a concept for one of funding and selection by the business, the scoring screen including a plurality of areas, each area including at least one sub-area, and each sub-area including a plurality of categories, wherein each of the plurality of categories includes one of numeric categories and non-numeric categories;

storing values in a data store of a plurality of category values and a plurality of coefficients based on a first strategic initiative of the business, wherein the plurality of coefficients include a plurality of sub-area coefficients each associated with one of the plurality of sub-areas and a plurality of area coefficients each associated with one of the plurality of areas;

receiving selections, via the scoring screen displayed on the computer display, of a plurality of the categories, one of the categories from each of the plurality of sub-areas, wherein the selected plurality of the categories evaluate the concept for one of funding and selection by the business associating each of the plurality of selected categories with a corresponding one of the plurality of category values;

reading the coefficients and the associated category values from the data store;

calculating, via a scoring component computer program embodied on a computer readable storage medium and executed by a processor, a concept score of the concept by calculating a plurality of area values defined as the sum of the products of each of the associated category values of the plurality of selected categories by the associated sub-area coefficient and further by summing the products of each of the plurality of area values multiplied by the associated area coefficient;

storing the calculated concept score;

storing at least one of at least one category value and at least one coefficient associated with a second strategic initiative of the business;

changing at least one of at least one of the plurality of coefficients and at least one of the category values corresponding with the plurality of selected categories to at least one of the at least one category value and the at least one coefficient associated with the second strategic initiative of the business;

automatically recalculating, via the scoring component, the stored concept score of the concept using the plurality of selected categories that evaluate the concept and at least one of the at least one changed coefficient and the at least one changed category value according to the second strategic initiative; and evaluating the strategic change in the business using the recalculated concept score according to the second strategic initiative.

2. The computer implemented method of claim 1, further comprising:

storing at least one of at least one category value and at least one coefficient associated with a third strategic initiative of the business;

changing at least one of at least one of the plurality of coefficients and at least one of the category values corresponding with the plurality of selected categories to at least one of the at least one category value and the at least one coefficient associated with the third strategic initiative of the business;

automatically recalculating the concept score based on the plurality of selected categories that evaluate the concept and at least one of the at least one changed category value and the at least one changed coefficient according to the third strategic initiative of the business; and evaluating the strategic change in the business using the concept score, the recalculated concept score according to the second strategic initiative, and the recalculated concept score according to the third strategic initiative.

3. The computer implemented method of claim 1, further comprising:

storing at least one of at least one of a plurality of category values and at least one of a plurality of coefficients for each of a plurality of strategic initiatives of the business;

changing at least one of at least one of the plurality of the coefficients and at least one of the category values corresponding with the plurality of selected categories to at least one of at least one of the plurality of category values and at least one of the plurality of coefficients for each of the plurality of strategic initiatives of the business;

automatically recalculating the concept score for each of the plurality of strategic initiatives based on the plurality of selected categories that evaluate the concept and each of at least one of the at least one of the plurality of changed category values and the at least one of the plurality of changed coefficients; and evaluating the strategic change in the business using the recalculated concept score according to each of the plurality of strategic initiatives.

4. The computer implemented method of claim 1, further comprising:

selecting a plurality of the categories, one of the categories from each of the plurality of sub-areas, for each of a plurality of concepts;

calculating a first set of concept scores for the plurality of concepts using the plurality of coefficients and the plurality of category values;

calculating a second set of concept scores by recalculating the set of concept scores for the plurality of concepts using at least one of the at least one changed coefficient and the at least one chance category value;

evaluating the strategic change in the business using the first set of concept scores and the second set of concept scores.

5. The computer implemented method of claim 1, wherein each sub-area includes a maximum number of categories for the plurality of categories.

6. The computer implemented method of claim 1, wherein a first and second of the plurality of sub-area coefficients have an associated first and second value, the first value greater than the second value to weight the first sub-area more than the second sub-area.

7. The computer implemented method of claim 1, wherein at least one of the values is a negative value.

8. The computer implemented method of claim 1, wherein values of desirable ones of the plurality of sub-areas are provided to promote a more favorable concept score when desirable ones of the plurality of categories are selected.

9. The computer implemented method of claim 1, wherein values of undesirable ones of the plurality of sub-areas are provided to promote a more negative concept score when undesirable ones of the plurality of categories are selected.

10. The computer implemented method of claim 1, wherein values of cost sub-areas of the plurality of sub-areas are provided to promote a more favorable concept score when lower cost categories of the plurality of categories are selected.

11. The computer implemented method of claim 1, wherein values of revenue sub-areas of the plurality of sub-areas are provided to promote a more favorable concept score when higher revenue categories of the plurality of categories are selected.

12. A system for evaluating a strategic change in a business, comprising:

at least one processor;

a graphical user interface that displays a scoring screen for evaluating a concept for one of funding and selection by the business, the scoring screen including a plurality of areas, each area including at least one sub-area, and each sub-area including a plurality of categories, wherein each of the plurality of categories include one of numeric categories and non-numeric categories;

a data store stored on a computer readable medium, when executed by the at least one processor, that stores values for a plurality of category values and a plurality of coefficients based on a first strategic initiative of the business and stores at least one of at least one category value and at least one coefficient associated with a second strategic initiative of the business, wherein the plurality of coefficients include a plurality of sub-area coefficients each associated with one of the plurality of sub-areas and a plurality of area coefficients each associated with one of the plurality of areas;

an association component stored on a computer readable medium, that when executed by the at least one processor, is responsive to selections in the graphical user interface of a plurality of the categories including a selection for one of the categories from each of the plurality of sub-areas, wherein the association component associates each of the plurality of selected categories with a corresponding one of the plurality of category values; and a concept scoring component stored on a computer readable medium, when executed by the at least one processor, that reads the plurality of coefficients and the associated category values from the data store and calculates a concept score of the concept by calculating a plurality of area values defined as the sum of the products of each of the category values of the plurality of selected categories by the associated sub-area coefficient and further by summing the products of each of the plurality of area values multiplied by the associated area coefficient, wherein the concept score is stored in the data store along with at least one other concept score calculated using the graphical user interface, the data store, the association component, and the concept scoring component, wherein upon at least one of at least one of the plurality of coefficients and at least one of the category values corresponding with the plurality of categories being changed to at least one of the at least one category value and the at least one coefficient associated with the second strategic initiative of the business, the concept scoring component automatically recalculates the concept scores stored in the data store using the plurality of selected categories and at least one of the at least one changed coefficient and the at least one changed category value according to the second strategic initiative,
wherein the recalculated concept score enables evaluating the strategic change in the business according to the second strategic initiative.

13. The system of claim 12, wherein at least one of the values is a negative value.

14. The system of claim 12, wherein each sub-area includes a maximum number of categories for the plurality of categories.

15. The system of claim 12, further comprising:
a concept evaluation system that further analyzes the concept.

16. The system of claim 15, wherein the concept evaluation system lists concepts according to the concept scores stored in the database, the concept evaluation system further analyzes the concepts based on concept score and another criterion.

17. The system of claim 12, wherein the areas include at least one of a financial area, a strategy area, an architecture area, and a marketing area.

18. The system of claim 12, wherein the values of desirable ones of the plurality of areas, sub-areas, and categories are provided to promote a more favorable concept score when desirable ones of the plurality of categories are selected and values of undesirable ones of the plurality of areas, sub-areas, and categories are provided to promote a more negative concept score when undesirable ones of the plurality of categories are selected.

19. A computer implemented method of evaluating a concept for one of funding and selection by a business, comprising:
displaying, via a computer display, a scoring screen for evaluating the concept for one of funding and selection by the business, the scoring screen including a plurality of areas, each area including at least one sub-area, and each sub-area including a plurality of categories, wherein each of the plurality of categories include one of numeric categories and non-numeric categories;
storing values in a data store of a plurality of category values and a plurality of coefficients based on a first strategic initiative of the business, wherein the plurality of coefficients include a plurality of sub-area coefficients each associated with one of the plurality of sub-areas and a plurality of area coefficients each associated with one of the plurality of areas;
receiving selections, via the scoring screen displayed on the computer display, of a plurality of the categories, one of the categories from each of the plurality of sub-areas, wherein the selected plurality of the categories evaluate the concept for one of funding and selection by the business;
associating each of the plurality of selected categories with a corresponding one of the plurality of category values;
reading the coefficients and the associated category values from the data store;
calculating, via a scoring component computer program embodied on a computer readable storage medium and executed by a processor, a first concept score of the concept by calculating a plurality of area values defined as the sum of the products of each of the associated category values of the plurality of selected categories by the associated sub-area coefficient and further by summing the products of each of the plurality of area values multiplied by the associated area coefficient;
storing the first concept score;
storing at least one of at least one category value and at least one coefficient associated with a second strategic initiative of the business;
changing at least one of at least one of the plurality of coefficients and at least one of the category values corresponding with the plurality of selected categories to at least one of the at least one category value and the at least one coefficient associated with the second strategic initiative of the business;
calculating, via the scoring component, a second concept score of the concept using the plurality of selected categories that evaluate the concept and at least one of the at least one changed coefficient and the at least one changed category value according to the second strategic initiative; and
evaluating the concept for one of funding and selection by the business using the first concept score and the second concept score.

20. The computer implemented method of claim 19, wherein evaluating the concept is based on evaluating an average of the first concept score and the second concept score.

21. The computer implemented method of claim 19, further comprising:
storing at least one of at least one category value and at least one coefficient associated with a third strategic initiative of the business;
changing at least one of at least one of the plurality of coefficients and at least one of the category values corresponding with the plurality of selected categories to at least one of the at least one category value and the at least one coefficient associated with the third strategic initiative of the business;
calculating a third concept score of the concept using the plurality of selected categories that evaluate the concept and at least one of the at least one changed coefficient and the at least one changed category value according to the third strategic initiative of the business; and
evaluating the concept using the first concept score, the second concept score, and the third concept score.

22. The computer implemented method of claim 19, further comprising:
storing at least one of at least one of a plurality of category values and at least one of a plurality of coefficients for each of a plurality of strategic initiatives of the business;
changing at least one of at least one of the plurality of the coefficients and at least one of the category values corresponding with the plurality of selected categories to at least one of the at least one of the plurality of category values and the at least one of the plurality of the coefficients for each of the plurality of strategic initiatives of the business;
calculating a plurality of concept scores, one for each of the plurality of strategic initiatives using the plurality of selected categories that evaluate the concept and each of at least one of the at least one of the plurality of changed coefficients and the at least one of the plurality of changed category values according to the associated one of the plurality of strategic initiatives of the business; and
evaluating the concept using the plurality of concept scores.

23. The computer implemented method of claim 19, wherein at least one of the values is a negative value.

24. The computer implemented method of claim 19, wherein each sub-area includes a maximum number of categories for the plurality of categories.

25. The computer implemented method of claim 19, wherein the areas include at least one of a financial area, a strategy area, an architecture area, and a marketing area.

26. The computer implemented method of claim 19, wherein the values of desirable ones of the plurality of areas, sub-areas, and categories are provided to promote a more favorable concept score when desirable ones of the plurality of categories are selected and values of undesirable ones of the plurality of areas, sub-areas, and categories are provided to promote a more negative concept score when undesirable ones of the plurality of categories are selected.

27. A system for evaluating a concept for one of funding and selection by a business, comprising:
   at least one processor;
   a graphical user interface that displays a scoring screen for evaluating the concept for one of funding and selection by the business, the scoring screen including a plurality of areas, each area including at least one sub-area, and each sub-area including a plurality of categories, wherein each of the plurality of categories include one of numeric categories and non-numeric categories;
   a data store stored on a computer readable medium, when executed by the at least one processor, that stores values for a plurality of category values and a plurality of coefficients based on a plurality of strategic initiatives of the business, and wherein the plurality of coefficients include a plurality of sub-area coefficients each associated with one of the plurality of sub-areas and a plurality of area coefficients each associated with one of the plurality of areas;
   an association component stored on a computer readable medium, that when executed by the at least one processor, is responsive to selections in the graphical user interface of a plurality of the categories including a selection for one of the categories from each of the plurality of sub-areas, wherein the association component associates each of the plurality of selected categories with a corresponding one of the plurality of category values for one of the plurality of strategic initiatives of the business; and
   a concept scoring component stored on a computer readable medium, when executed by the at least one processor, that reads the plurality of coefficients and the associated category values for the one of the plurality of strategic initiatives of the business from the data store and calculates a concept score of the concept by calculating a plurality of area values defined as the sum of the products of each of the associated category values of the plurality of selected categories by the associated sub-area coefficient for the one of the plurality of strategic initiatives of the business and further by summing the products of each of the plurality of area values multiplied by the associated area coefficient for the one of the plurality of strategic initiatives of the business,
   wherein the concept scoring component calculates a plurality of concept scores for the concept, each of the plurality of concept scores calculated based on the plurality of selected categories and a change in at least one of at least one of the plurality of coefficients and at least one of the category values corresponding with the plurality of selected categories with the change being made in accordance with each of the plurality of strategic initiatives of the business,
   wherein the plurality of concept scores are stored in the data store, and
   wherein the concept is evaluated based on the plurality of concept scores.

28. The system of claim 27, wherein at least one of the values is a negative value.

29. The system of claim 27, wherein each sub-area includes a maximum number of categories for the plurality of categories.

30. The system of claim 27, wherein the areas include at least one of a financial area, a strategy area, an architecture area, and a marketing area.

31. The system of claim 27, wherein the values of desirable ones of the plurality of areas, sub-areas, and categories are provided to promote a more favorable concept score when desirable ones of the plurality of categories are selected and values of undesirable ones of the plurality of areas, sub-areas, and categories are provided to promote a more negative concept score when undesirable ones of the plurality of categories are selected.

* * * * *